(12) United States Patent
An et al.

(10) Patent No.: US 8,342,699 B2
(45) Date of Patent: Jan. 1, 2013

(54) ELECTRONIC DEVICE WITH VIRTUAL KEYBOARD FUNCTION

(75) Inventors: Wei-Peng An, Shenzhen (CN); Feng-Xiang Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 855 days.

(21) Appl. No.: 12/494,320

(22) Filed: Jun. 30, 2009

(65) Prior Publication Data
US 2010/0245235 A1     Sep. 30, 2010

(30) Foreign Application Priority Data
Mar. 24, 2009   (CN) .......................... 2009 1 0301090

(51) Int. Cl.
G03B 21/26     (2006.01)
G03B 21/14     (2006.01)
G03B 21/22     (2006.01)
G06F 3/038     (2006.01)
H04M 1/00      (2006.01)

(52) U.S. Cl. .......... 353/119; 353/30; 345/156; 345/204; 455/556.1

(58) Field of Classification Search .................. 353/119, 353/30; 345/204, 156; 455/556.1, 429
See application file for complete search history.

(56) References Cited

U.S. PATENT DOCUMENTS

| 7,832,877 | B2 * | 11/2010 | Yun et al. ......................... 353/99 |
| 8,186,836 | B2 * | 5/2012 | Nakamura ....................... 353/85 |
| 2003/0013493 | A1 * | 1/2003 | Irimajiri et al. ............... 455/566 |
| 2008/0055566 | A1 * | 3/2008 | Yun ................................. 353/82 |
| 2009/0036158 | A1 * | 2/2009 | Fujinawa et al. .......... 455/556.1 |

* cited by examiner

Primary Examiner — Georgia Y Epps
Assistant Examiner — Magda Cruz
(74) Attorney, Agent, or Firm — Altis Law Group, Inc.

(57) ABSTRACT

An electronic device includes a body, a rotatable member, a projecting unit configured for projecting an image, a sensing unit and a processing unit. The body includes a connecting end, and a plurality of conductive contacts is formed at the connecting end. The rotatable member is rotatably connected to the connecting end. The rotating member includes a conductive ball configured for being electrically connected to one of the plurality of the conductive contacts, and the plurality of conductive contacts are formed along a displacement path of the conductive ball. The sensing unit is configured for sensing interactions at specific locations corresponding to the projected image. The processing unit stores a plurality of images, and is configured for controlling the projecting unit to project a corresponding image according to the conductive contact which is electrically connected to the conductive ball.

11 Claims, 4 Drawing Sheets

ELECTRONIC DEVICE WITH VIRTUAL KEYBOARD FUNCTION

BACKGROUND

1. Technical Field

The present disclosure relates to electronic devices, and particularly, to an electronic device with a virtual keyboard function.

2. Description of Related Art

A virtual keyboard technology has been developed. Electronic devices, such as cell phones, with the virtual keyboard technology can project a virtual keyboard (image) onto a surface and detect a keystroke on the virtual keyboard by detecting interactions at specific locations on the projected image. However, most virtual keyboard projectors are separate from the electronic device and each application of the electronic device may adopt a different input device other than the virtual keyboard. This is an inconvenience.

Therefore, what is needed is to provide an electronic device, in which the above problem is eliminated or at least alleviated.

DETAILED DESCRIPTION

Figure 1:
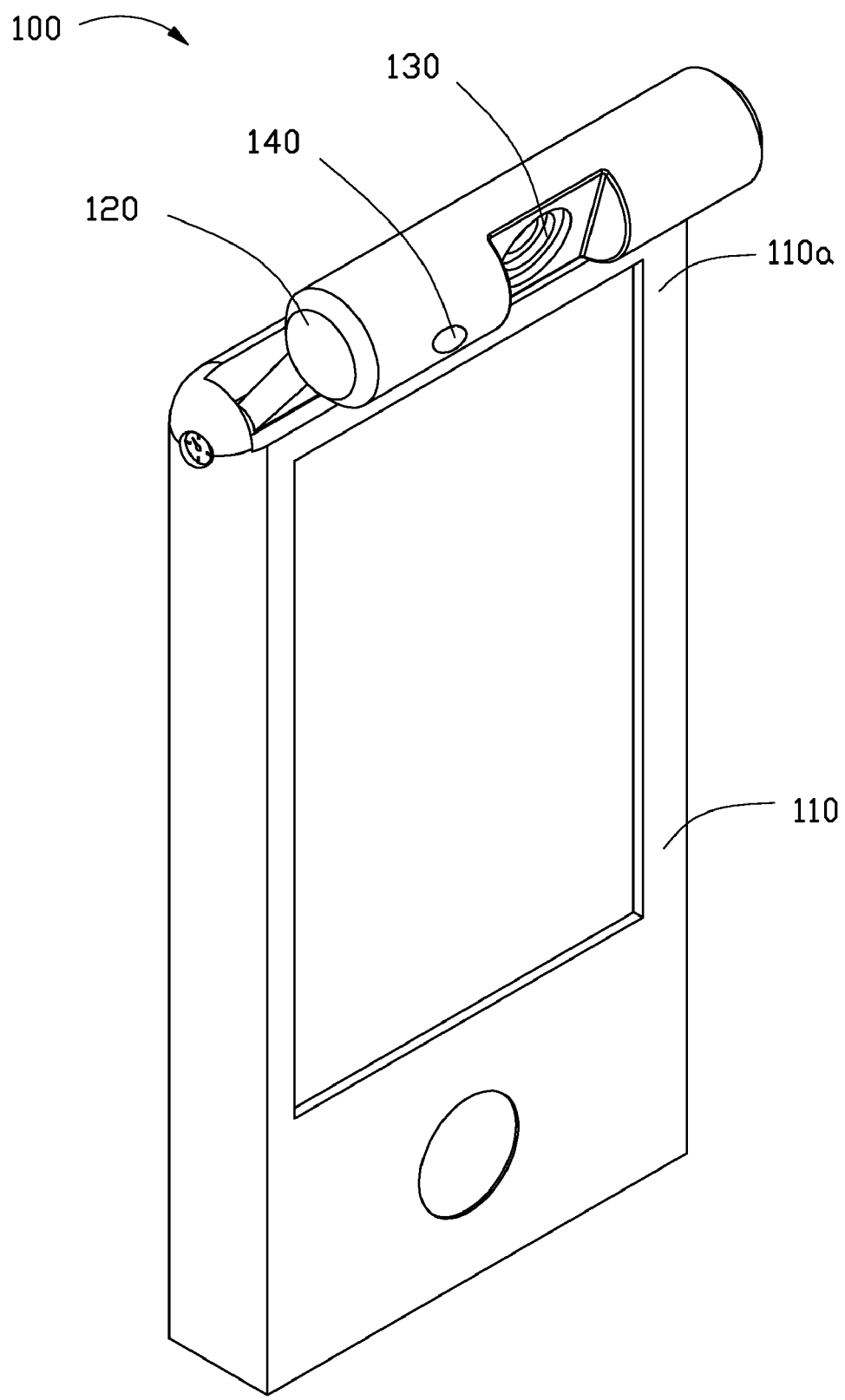
FIG. 1 is a schematic isometric view of an electronic device, according to an exemplary embodiment.
Figure 2:
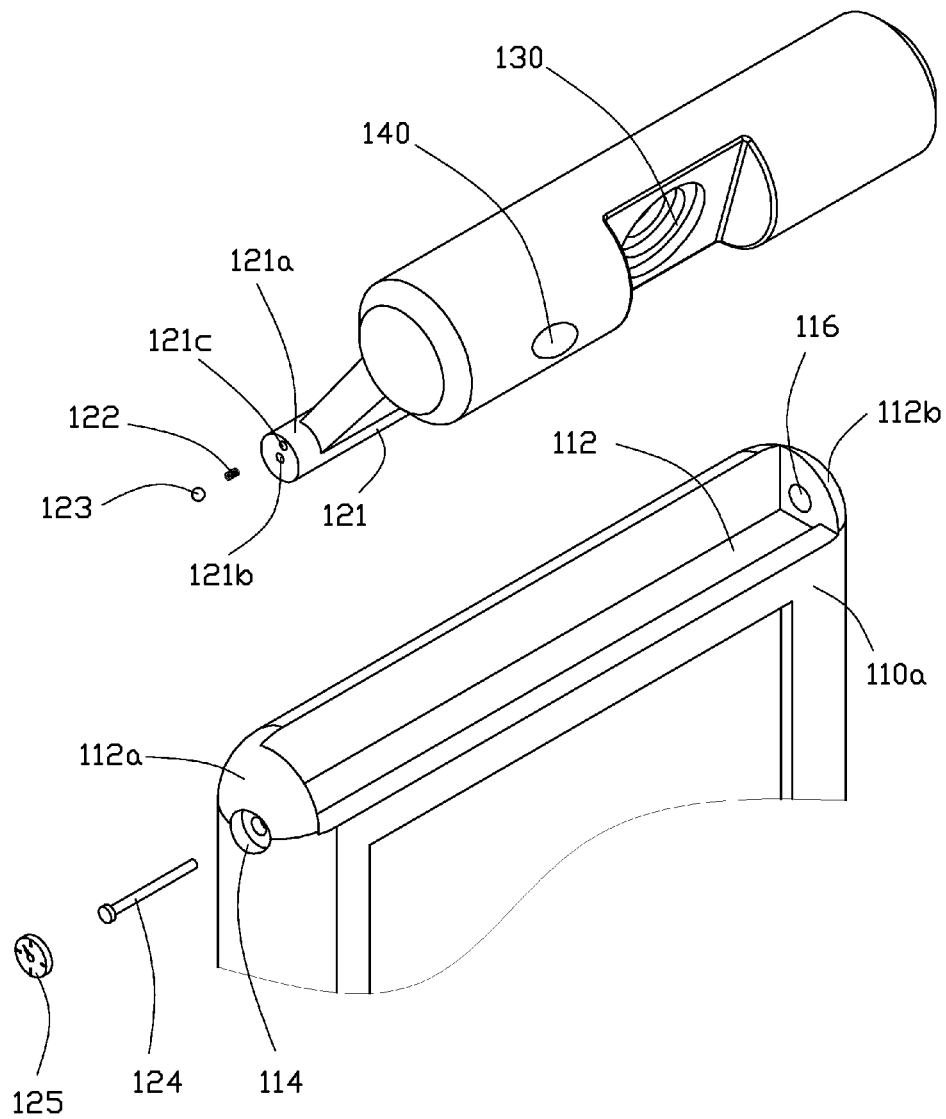
FIG. 2 is a partially-dissembled enlarged schematic isometric view of the electronic device of FIG. 1.
Figure 4:
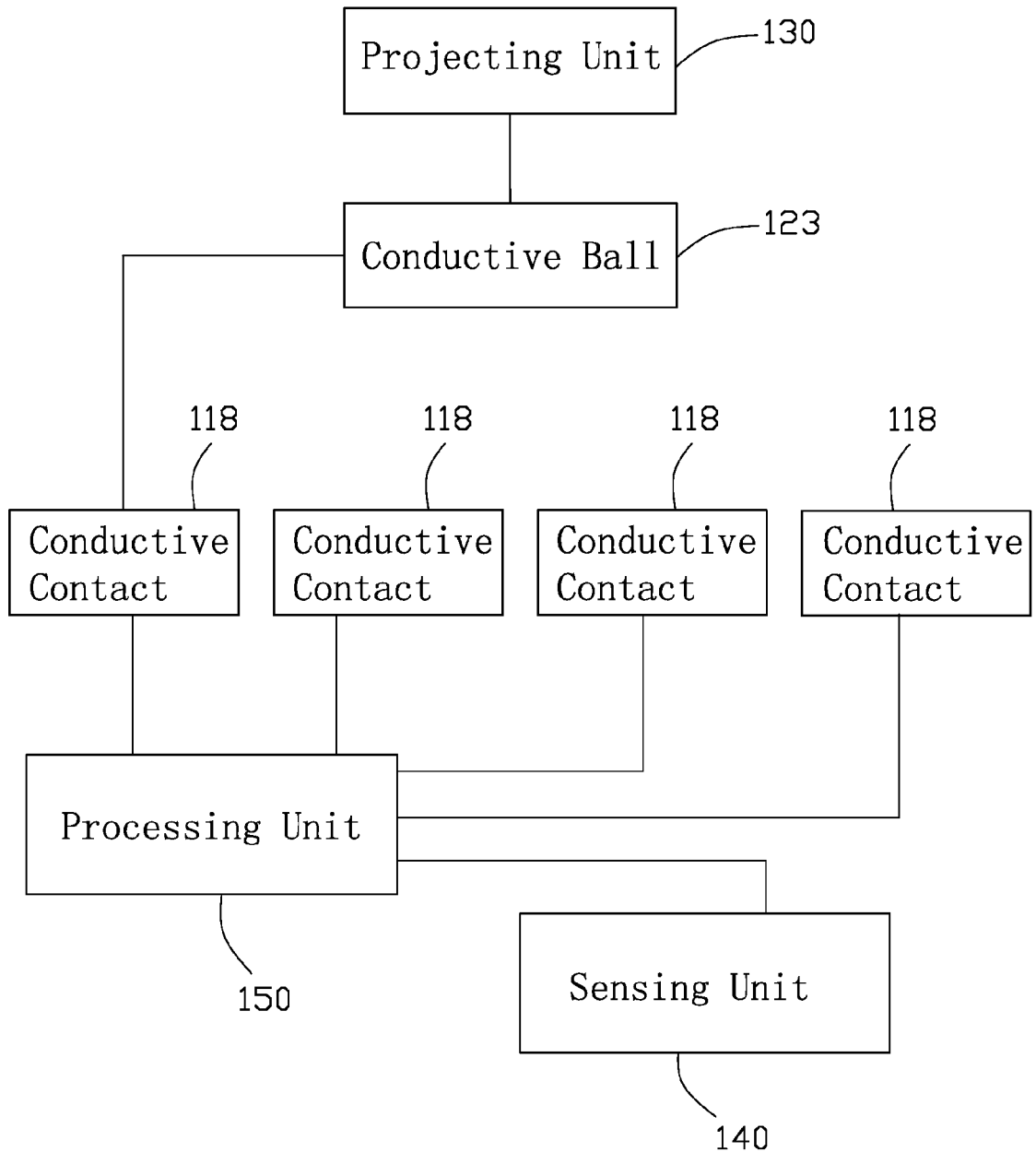
FIG. 4 is a functional block diagram of the electronic device of FIG. 1.

Referring to FIGS. 1-2 and 4, an electronic device 100, according to an exemplary embodiment, includes a body 110, a rotatable member 120, a projecting unit 130, a sensing unit 140, and a processing unit 150. The rotatable member 120 is rotatably mounted on a connecting end 110a of the body 110. The projecting unit 130 and the sensing unit 140 are received in the rotatable member 120, and rotate with the rotatable member 120.

A receiving groove 112 is defined in the connecting end 110a of the body 110. A first side wall 112a and a second side wall 112b on another side of the connecting end 10a opposite to the first side wall 112a are formed at the connecting end 10a, separated by the receiving groove 112. A stepped through hole 114 is defined through the first side wall 112a. A first receiving hole 116 is defined in the second side wall 112b.

The rotatable member 120 includes an axle 121, an elastic portion 122, a conductive ball 123, a bolt 124, and a dial 125. The axle 121 is rotatably received in the receiving groove 112. The projecting unit 130 and the sensing unit 140 are rotatable about the axle 121. The axle 121 includes a first end 121a and an opposite second end (not shown). A center hole 121b and a second receiving hole 121c are defined in an end surface of the first end 121a. The center hole 121b is spaced from the second receiving hole 121c and aligned with the stepped through hole 114. A positioning pole (not shown) extends from an end surface of the second end and is rotatably received in the first receiving hole 116. The elastic portion 122 may be a coil spring and is received in the second receiving hole 121c. The conductive ball 123 may be made from copper or gold. The conductive ball 123 is partially received in the second receiving hole 121c, and rotated by the rotation of the axle 121. The conductive ball 123 abuts the elastic portion 122 so that the elastic portion 122 is at a compressed state in the second receiving hole 121c.

The bolt 124 is rotatably inserted through the stepped through hole 114 and screwed into the center hole 121b. Therefore, the bolt 124 rotates simultaneous with the axle 121. The dial 125 is fixedly attached to the bolt 124 and is configured for indicating a rotated angle of the rotatable member 120.

Figure 3:
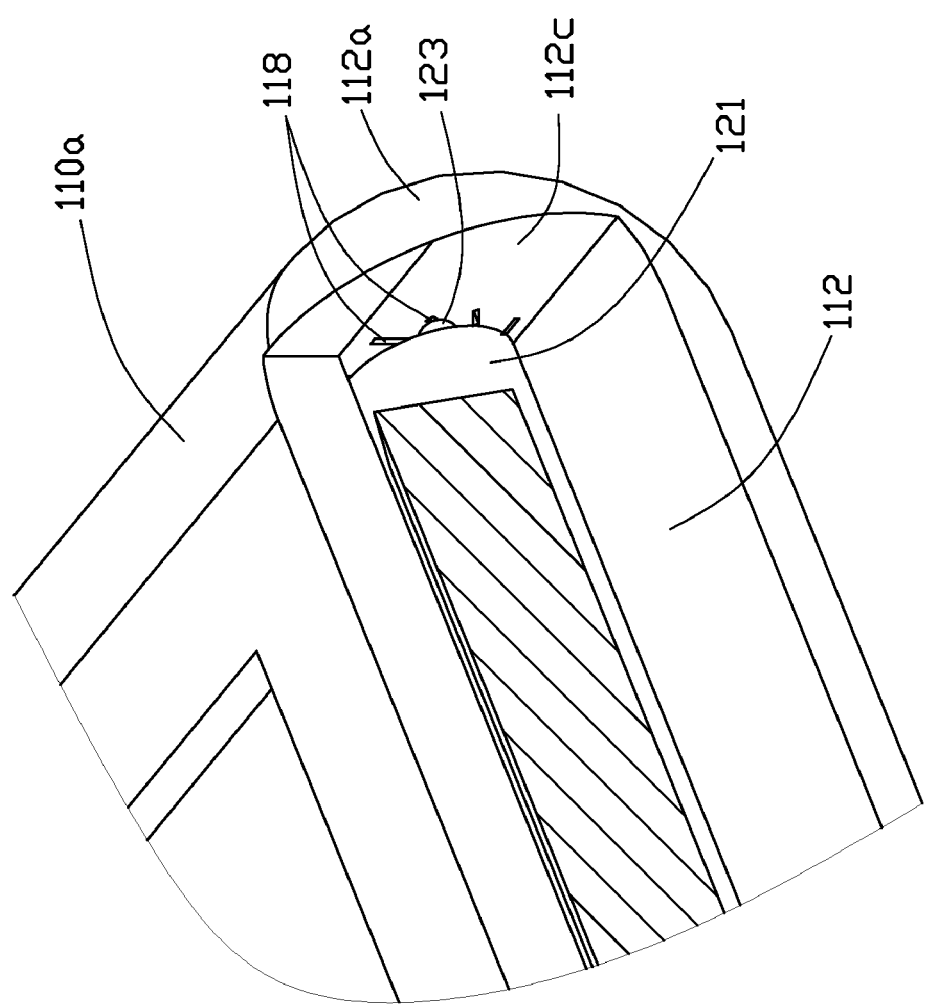
FIG. 3 is a partially-enlarged cut-away view of the electronic device of FIG. 1.

Also referring to FIG. 3, numerous conductive contacts 118 are formed on an inner surface 112c of the first side wall 112a where the stepped through hole 114 is defined. The conductive contacts 118 may be made from copper or gold. The conductive contacts 118 are formed along a displacement path of the conductive ball 123. Therefore, the conductive ball 123 electrically contacts and abuts one of the conductive contacts 118, depending on the rotated angle of the rotatable member 120.

Referring to FIG. 4, the projecting unit 130 is electrically connected to the conductive ball 123 and is configured for projecting an image. The sensing unit 140 is electrically connected to the processing unit 150 and is configured for sensing interactions at specific locations corresponding to the projected image. The sensing unit 140 may include an optical sensor, such as a charge-coupled device.

Numerous images are pre-stored in the processing unit 150. The processing unit 150 is received in the body 110 and is electrically connected to the conductive contacts 118 and is configured for controlling the projecting unit 130 to project a corresponding image according to the conductive contact 118 which is electrically connected to the conductive ball 123. In this embodiment, the images include a QWERTY keyboard image, a keypad image, a music keyboard image, and a game pad image. Therefore, the images are designated by the processing unit 150 to satisfy a condition that a corresponding conductive contact 118 is electrically connected to the conductive ball 123. In this way, various virtual keyboards associated with various applications such as, music application, game application etc. installed in the electronic device 100 can be projected.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
   a body comprising a connecting end, and a plurality of conductive contacts formed at the connecting end;
   a rotatable member rotatably connected to the connecting end, the rotating member comprising a conductive ball configured for being electrically connected to one of the plurality of conductive contacts, the plurality of conductive contacts formed along a displacement path of the conductive ball;
   a projecting unit configured for projecting an image;
   a sensing unit configured for sensing interactions at specific locations corresponding to the projected image; and
   a processing unit storing a plurality of images, the processing unit configured for controlling the projecting unit to project a corresponding image according to the conductive contact which is electrically connected to the conductive ball.

2. The electronic device as claimed in claim 1, wherein the conductive ball is made from copper.

3. The electronic device as claimed in claim 1, wherein the conductive ball is made from gold.

4. The electronic device as claimed in claim 1, wherein the conductive contact is made from copper.

5. The electronic device as claimed in claim 1, wherein the conductive contact is made from gold.

6. The electronic device as claimed in claim 1, wherein the sensing unit comprises an optical sensor configured for sensing the interactions at specific locations corresponding to the projected image.

7. The electronic device as claimed in claim 1, wherein a receiving groove is defined in the connecting end of the body, and the rotatable member comprises an axle rotatably received in the receiving groove.

8. The electronic device as claimed in claim 7, wherein the rotatable member further comprises an elastic portion, a receiving hole defined at an end surface of the axle, the elastic portion received in the receiving hole, the conductive ball partially received in the receiving hole and abutting the elastic portion.

9. The electronic device as claimed in claim 8, wherein the rotatable member further comprises a bolt and a dial, and a center hole is defined at the end surface of the axle and spaced from the receiving hole, and the body further comprises a first side wall and an opposite second side wall formed at the connecting end and separated by the receiving groove, and a stepped through hole is defined through the first side wall and aligned with the center hole, the bolt rotatably inserted through the stepped through hole and screwed into the center hole, the dial fixedly attached to the bolt and configured for indicating a rotated angle of the rotatable member.

10. The electronic device as claimed in claim 9, wherein the conductive contacts are formed on an inner surface of the first side wall.

11. The electronic device as claimed in claim 1, wherein the projecting unit and the sensing unit are received in the rotatable member.

* * * * *